US008423090B2

(12) United States Patent
Swaby

(10) Patent No.: US 8,423,090 B2
(45) Date of Patent: Apr. 16, 2013

(54) HANDHELD WIRELESS COMMUNICATION DEVICE WITH FISH SHAPE AND MOVING EYE ALERT

(76) Inventor: Pressley Swaby, Westbury, NY (US)

( * ) Notice: Subject to any disclaimer, the term of this patent is extended or adjusted under 35 U.S.C. 154(b) by 1302 days.

(21) Appl. No.: 12/177,204

(22) Filed: Jul. 22, 2008

(65) Prior Publication Data

US 2010/0022278 A1    Jan. 28, 2010

(51) Int. Cl.
*H04B 1/38* (2006.01)
*H04W 88/02* (2009.01)

(52) U.S. Cl.
USPC ........................................ 455/567; 455/575.3

(58) Field of Classification Search ................. None
See application file for complete search history.

(56) References Cited

U.S. PATENT DOCUMENTS

| D362,251 S | * | 9/1995 | Fitzgerald ................... D14/143 |
| 8,135,128 B2 | * | 3/2012 | Marti et al. ................... 379/372 |
| 2002/0164918 A1 | * | 11/2002 | Chuang ........................ 446/153 |
| 2003/0119477 A1 | * | 6/2003 | Uppal et al. ................. 455/408 |
| 2004/0204150 A1 | * | 10/2004 | Cho .............................. 455/567 |
| 2005/0020327 A1 | * | 1/2005 | Chung et al. ............... 455/575.3 |
| 2008/0058038 A1 | * | 3/2008 | Murdoch et al. .......... 455/575.3 |

FOREIGN PATENT DOCUMENTS

JP    10127323 A    *   5/1998

* cited by examiner

*Primary Examiner* — Philip Sobutka
(74) *Attorney, Agent, or Firm* — Jerry D. Haynes; Law Office of Jerry D. Haynes P.A.

(57) ABSTRACT

Disclosed is a wireless communication device for a user. The wireless communication device includes a first body portion and a second body portion pivotally coupled to the first body portion. The first body portion includes a keypad on a first side of the wireless communication device. Further, the first body portion includes a display screen positioned above the keypad on the first side of the wireless communication device. The second body portion of the wireless communication device is capable of vibrating in response to an occurrence of an event for alerting the user. Further disclosed is a vibration assembly configured to operate in the wireless communication device for alerting the user about the occurrence of an event. Also disclosed is a method for alerting the user about the occurrence of an event using the wireless communication device.

8 Claims, 4 Drawing Sheets

HANDHELD WIRELESS COMMUNICATION DEVICE WITH FISH SHAPE AND MOVING EYE ALERT

FIELD OF THE INVENTION

The present invention relates generally to a wireless communication device, and more specifically, to a handheld wireless communication device and a method for alerting a user about an occurrence of an event, such as an incoming telephone call, using the handheld wireless communication device.

BACKGROUND OF THE INVENTION

With an overwhelming evolution in the field of wireless communication devices, mobile phones have become increasingly popular. Suitable examples of other widely used wireless communication devices include, but are not limited to Personal Data Assistants (PDAs), and two-way pagers, to name a few.

The aforementioned wireless communication devices provide a wide variety of ways for notifying or alerting a user about an occurrence of an event, such as an incoming telephone call (hereinafter referred to as an "incoming call") and an upcoming appointment. In general, such a user alert functionality configured in a wireless communication device may be categorized either as an audible functionality, a visual functionality, a tactile functionality or a combination thereof. For example, the wireless communication devices, including mobile phones, may be set either to a ringer mode or a vibration mode or a combination thereof to alert a user about an incoming call.

Accordingly, various alert tones have been employed in the wireless communication devices for alerting a user either about an incoming call or about such a similar event. Alternatively, tactile functionality has also been employed in a wireless communication device for alerting a user either about an incoming call or about such a similar event. To date, the tactile functionality has been generally limited to standard vibration techniques that involve vibrating of an entire wireless communication device in relation to its surroundings by use of an internal vibration mechanism. This internal vibration mechanism may employ spinning of an overbalanced motor included within the wireless communication device. However, wireless communication devices with such tactile functionality usually employ multiple other features, which increase complexity of the wireless communication devices. Further, for being updated with upcoming technologies, such wireless communication devices employ innumerable features, such as emails, Short Messaging Services (SMS), Enhanced Messaging Services (EMS), video camera and web browser, which need not be commonly utilized by a user. With the employment of such features, the complexity to use the wireless communication devices increases. Accordingly, with the increased complexity, the wireless communication devices are not easily operable by individuals of different age groups. More specifically, it is very difficult for an aged individual to use such a wireless communication device, which is configured to include complex features.

Furthermore, as more and more individuals desire to carry their wireless communication devices along with them at any point of time, there is an increased demand for small and portable wireless communication devices. At the same time, there is an increased demand for a better display of content of information that is to be disclosed on screens of the wireless communication devices. Such information may include information about an incoming telephone caller, such as name of a caller; about an SMS message, such as content of the message; and the like. However, with a decrease in sizes of the wireless communication devices, it is becoming increasingly difficult to efficiently display suitable information on the screens of the wireless communication devices. Additionally, existing wireless communication devices are not known to possess aesthetically appealing shapes, which allow the existing wireless communication devices to configure large screens thereon.

Accordingly, there is a need for an easy-to-operate, a user-friendly and a handheld wireless communication device. Further, the wireless communication device should include a large and an easy-to-read screen for efficiently displaying a greater amount of content of information thereon. Furthermore, the wireless communication device should include an efficient user alerting functionality, which is capable of alerting a user about an occurrence of an event, such as an incoming call. Additionally, there is a need for a method for alerting the user of the wireless communication device about the occurrence of an event.

SUMMARY OF THE INVENTION

In view of the foregoing disadvantages inherent in the prior art, the general purpose of the present invention is to provide a wireless communication device with an efficient user alert functionality and a method for alerting a user about an occurrence of an event, such as an incoming call using the wireless communication device, which includes all the advantages of the prior art, and overcomes the drawbacks inherent therein.

Accordingly, an object of the present invention is to provide an easy-to-operate, a user-friendly and a handheld wireless communication device.

Another object of the present invention is to provide a wireless communication device that includes a large and an easy-to-read screen for efficiently displaying a greater amount of content of information thereon.

Yet another object of the present invention is to provide a wireless communication device that includes an efficient user alerting functionality that is capable of alerting a user about an occurrence of an event, such as an incoming call.

Still another object of the present invention is to provide a method for alerting a user of a wireless communication device about an incoming call.

In light of the above objects, in one aspect, the present invention discloses a wireless communication device for a user. The wireless communication device includes a first body portion and a second body portion pivotally coupled to the first body portion. The first body portion includes a keypad on a first side of the wireless communication device. Further, the first body portion includes a display screen positioned above the keypad on the first side of the wireless communication device. Furthermore, the first body portion includes a battery accessible from a second side of the wireless communication device. The second body portion, which is pivotally coupled to the first body portion, is capable of vibrating in response to an occurrence of an event for alerting the user.

In another aspect, the present invention discloses a vibration assembly for alerting a user of a wireless communication device that includes a first body portion and a second body portion. The vibration assembly includes a receiving unit for receiving a user alert signal for an occurrence of an event. Further, the vibration assembly includes a vibration controller unit operatively coupled to the receiving unit for generating and transmitting a vibration control signal in response to the received user alert signal. Furthermore, the vibration assembly includes an actuator operatively coupled to the vibration controller unit for receiving the transmitted vibration control signal. The actuator on receiving the transmitted vibration control signal is capable of vibrating the second body portion of the wireless communication device to alert the user for the occurrence of an event.

In yet another aspect, the present invention discloses a method for alerting a user of a wireless communication device that includes a first body portion and a second body portion. The method includes receiving a user alert signal in response to an occurrence of an event. Further, the method includes generating and transmitting a vibration control signal in response to the received user alert signal. Furthermore, the method includes receiving the transmitted vibration control signal. Additionally, the method includes vibrating the second body portion of the wireless communication device in response to the received vibration control signal, thereby alerting the user about the occurrence of an event.

These together with other embodiments of the present invention, along with the various features of novelty that characterize the present invention, are pointed out with particularity in the claims annexed hereto and form a part of this disclosure. For a better understanding of the present invention, its operating advantages, and the specific objects attained by its uses, reference should be made to the accompanying drawings and the descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, in which:

Like reference numerals refer to like parts throughout the description of the drawings.

DETAILED DESCRIPTION OF THE INVENTION

The exemplary embodiments described herein detail for illustrative purposes are subject to many variations in structure and design. It should be emphasized, however, that the present invention is not limited to a particular wireless communication device, a vibration assembly configured to operate in the wireless communication device, and a method for alerting a user about an occurrence of an event using the wireless communication device, as shown and described. It is understood that various omissions and substitutions of equivalents are contemplated as circumstances may suggest or render expedient, but these are intended to cover the application or implementation without departing from the spirit or scope of the claims of the present invention.

Also, it is to be understood that the phraseology and terminology used herein is for the purpose of description and should not be regarded as limiting. The use of terms, "including," or "comprising," and variations thereof herein is meant to encompass the items listed thereafter and equivalents thereof as well as additional items. Further, the terms "a" and "an" herein do not denote a limitation of quantity, but rather denote the presence of at least one of the referenced item. Furthermore, the terms "first," "second," and the like, herein do not denote any order, quantity, or importance, but rather are used to distinguish one element from another.

Unless limited otherwise, the terms, "coupled," "connected" and variations thereof herein are used broadly and encompass direct and indirect couplings and connections. In addition, the terms, "coupled," "connected" and variations thereof are not restricted to physical or mechanical couplings or connections.

The present invention relates to a wireless communication device for a user. The term, "wireless communication device," as used herein may refer either to a mobile phone, a PDA, a two-way pager or such a similar wireless communication device that is capable of receiving a user alert signal, such as an incoming telephone call signal. The wireless communication device is explained in conjunction with FIG. 1.

Figure 1:
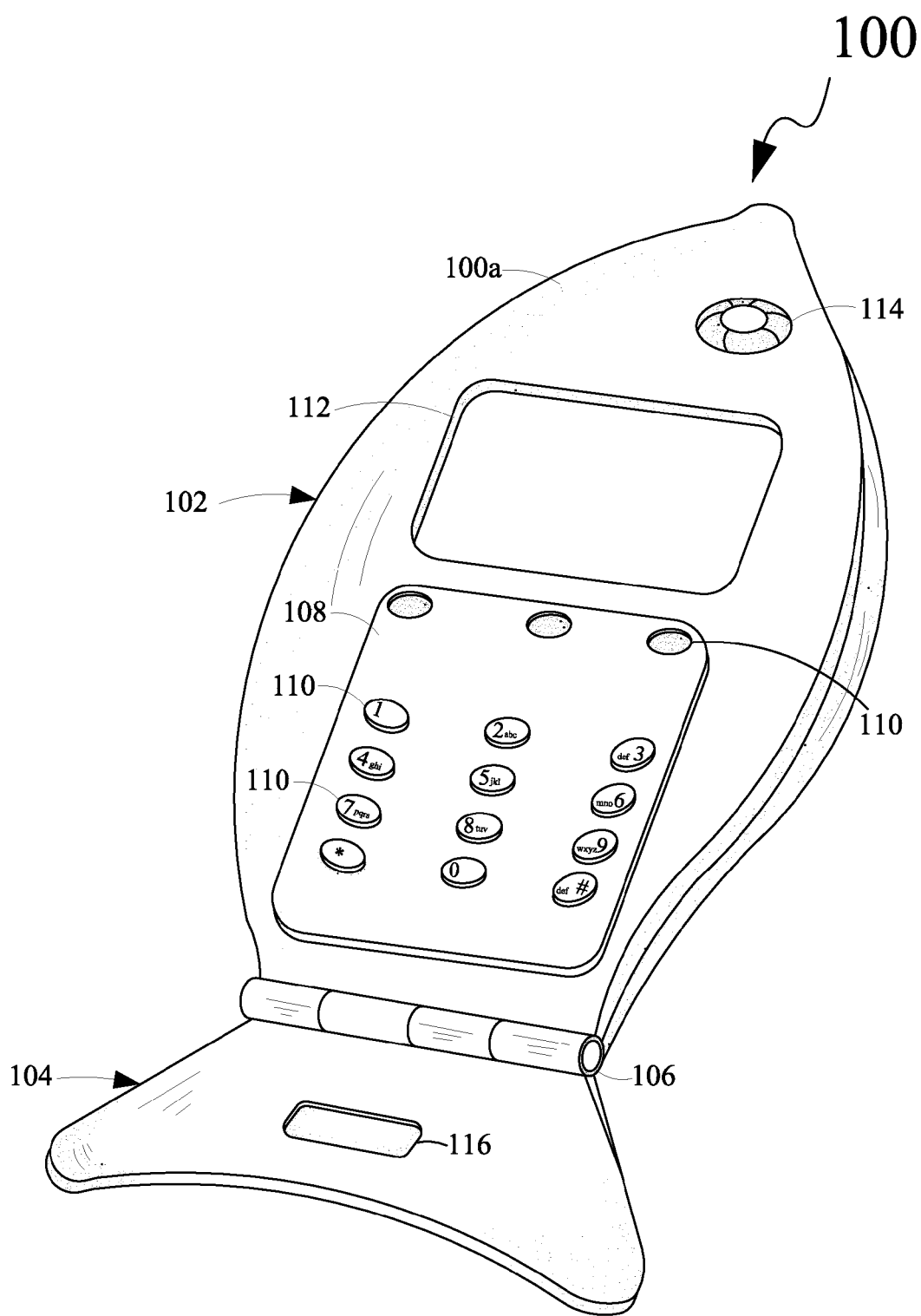
FIG. 1 depicts a perspective view of a wireless communication device 100, according to an exemplary embodiment of the present invention.

FIG. 1 depicts a perspective view of a wireless communication device 100, according to an exemplary embodiment of the present invention. As depicted, the wireless communication device 100 is configured to have a shape of a fish. Without departing from the scope of the present invention, the wireless communication device 100 may be a flip phone.

The wireless communication device 100 of the present invention includes a first body portion 102 and a second body portion 104, which represents a tail of the first body portion 102. The second body portion 104 is pivotally coupled to the first body portion 102 through a hinge 106. Further, the wireless communication device 100 has a first side 100a and a second side (not shown). More specifically, the first side 100a represents a front side of the wireless communication device 100 and the second side represents a backside of the wireless communication device 100. Furthermore, the first side 100a and the second side may be configured to have outer surfaces with a scaly texture. Accordingly, the said feature enables the wireless communication device 100 to have a scaly appearance from outside.

The first body portion 102 of the wireless communication device 100 includes a keypad 108 on the first side 100a of the wireless communication device 100. The keypad 108 includes a plurality of buttons 110, hereinafter referred to as "buttons 110." Each of the buttons 110 is designated for at least one of one or more alphabets, one or more numbers and one or more symbols. Accordingly and without departing from the scope of the present invention, the keypad 108 may be an alphanumeric keypad. Alternatively, the keypad 108 may be a simple numeric keypad. It should be understood that depending on a user's requirement, the buttons 110 may be used for a particular activity. For example, the buttons 110 may be used to type a telephone number, or for typing an SMS message. As depicted in FIG. 1, it should also be understood that the shape of the wireless communication device 100 is such that the wireless communication device 100 is capable of employing a large keypad, such as the keypad 108, for an easy and optimal functioning and use of buttons, such as the buttons 110, configured thereon.

Further, the first body portion 102 includes a display screen 112 positioned above the keypad 108 on the first side 100a of the wireless communication device 100. The display screen 112 is capable of displaying information in form of text, numbers, symbols and combinations thereof. Further, the display screen 112 is a colored screen. However, it should be apparent that the display screen 112 may be a black and white screen. As depicted in FIG. 1, it should be understood that the shape of the wireless communication device 100 allows for employing a large display screen, such as the display screen 112, which enables an optimal and easy readability of content of information as displayed thereon. Accordingly, the display screen 112 serves as an easy-to-read display screen, which may even enable a person who is incapable of reading text of a small size to easily read content of information displayed on the display screen 112. Therefore, it should be apparent that the display screen 112 efficiently displays suitable information thereon and enhances readability of content of such information. As used herein, the phrase, "content of information," may be represented using numerals, text and symbols, and may refer to details of an incoming call, such as a name of a caller; details of an SMS message, such as content of the message; and the like.

Furthermore, the first body portion 102 includes a battery (not shown), which is accessible from the second side of the wireless communication device 100. The battery is a power supply that allows the wireless communication device 100 to operate. It should be understood that size and shape of the battery may vary depending on size and the shape of the wireless communication device 100. Also, the size and the shape of the battery may vary depending on various features, which may be employed in the wireless communication device 100. It should be understood that the term, "battery," as used herein, refers to any battery known in the art that is used to supply power to wireless communication devices, and more specifically, to mobile phones.

Additionally, the first body portion 102 includes a moving eye assembly 114 that is positioned above the display screen 112 on the first side 100a of the wireless communication device 100. The moving eye assembly 114 may be used to enhance aesthetic appearance of the fish-shaped wireless communication device 100. It should be understood that the moving eye assembly 114 is adapted to simulate movement of an eyeball of an eye of a real fish. Furthermore, the moving eye assembly 114 may be designed to include an earpiece for the purposes of listening during either an incoming telephone call (hereinafter referred to as an "incoming call") or an outgoing telephone call (hereinafter referred to as an "outgoing call"). Additionally, the moving eye assembly 114 may move in a specific manner for alerting a user about an incoming call.

The wireless communication device 100 also includes a mouthpiece 116 for the purposes of speaking during either an incoming call or an outgoing call. More specifically, the mouthpiece 116 may be configured on the second body portion 104 of the wireless communication device 100 as depicted in FIG. 1. It should be apparent to a person skilled in the art that the wireless communication device 100 may further be characterized with other necessary features, which enable the wireless communication device 100 to receive and send calls; to receive and send messages; and the like. Examples of such features may include, but are not limited to, an antenna, a transceiver and one or more filters.

The second body portion 104 of the wireless communication device 100 that is pivotally coupled to the first body portion 102 is capable of vibrating in response to an occurrence of an event for alerting the user. The term, "an occurrence of an event," as used herein, may refer to an incoming call, an incoming message, an alarm and/or an upcoming appointment. For the purpose of this description, the second body portion 104 vibrates in response to an incoming call for alerting the user. Accordingly and as mentioned above, the second body portion 104 functions as the vibrating tail of the fish-shaped wireless communication device 100.

It should be understood that the vibration of the second body portion 104 may be initiated by a vibration assembly. Such a vibration assembly configured to operate in a wireless communication device, such as the wireless communication device 100, is explained in conjunction with FIG. 2 and FIG. 3.

Figure 2:
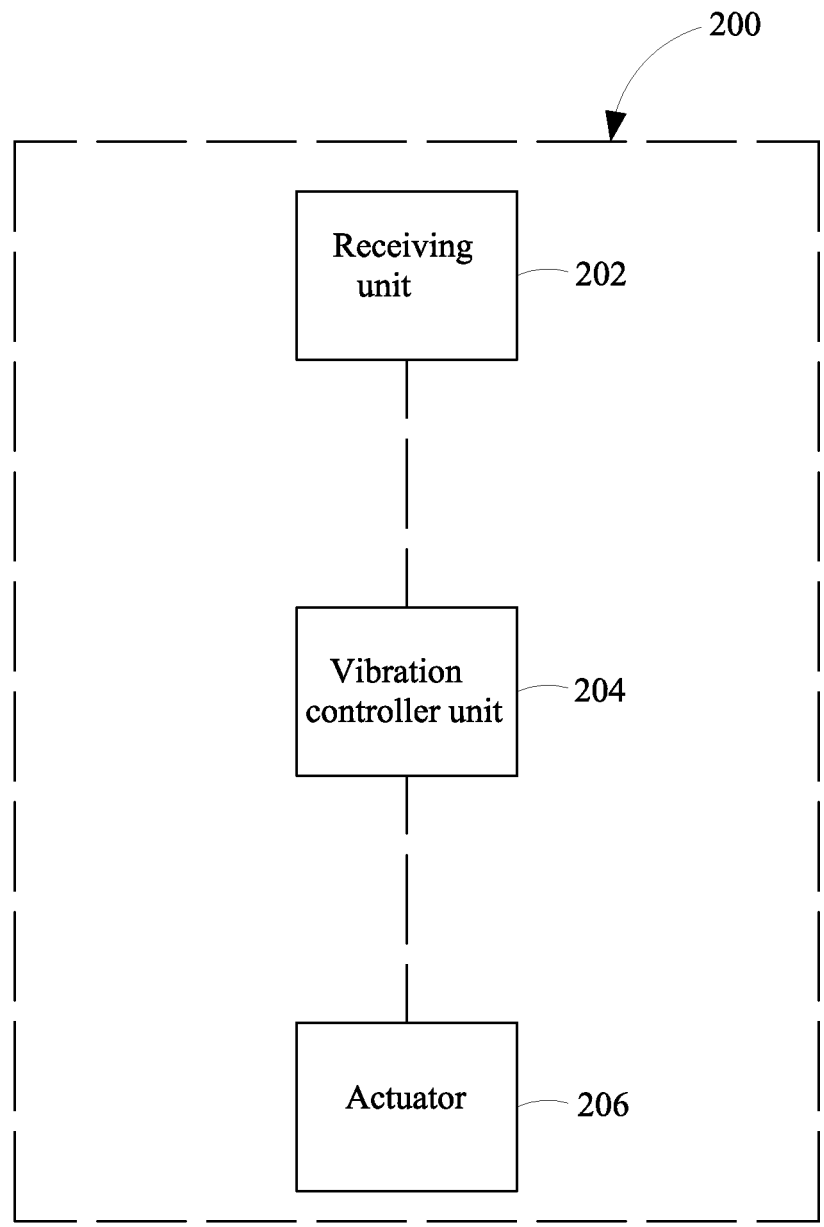
FIG. 2 depicts a block diagram representation of a vibration assembly 200 configured to operate in the wireless communication device 100 for alerting a user about an occurrence of an event, according to an exemplary embodiment of the present invention.
Figure 3:
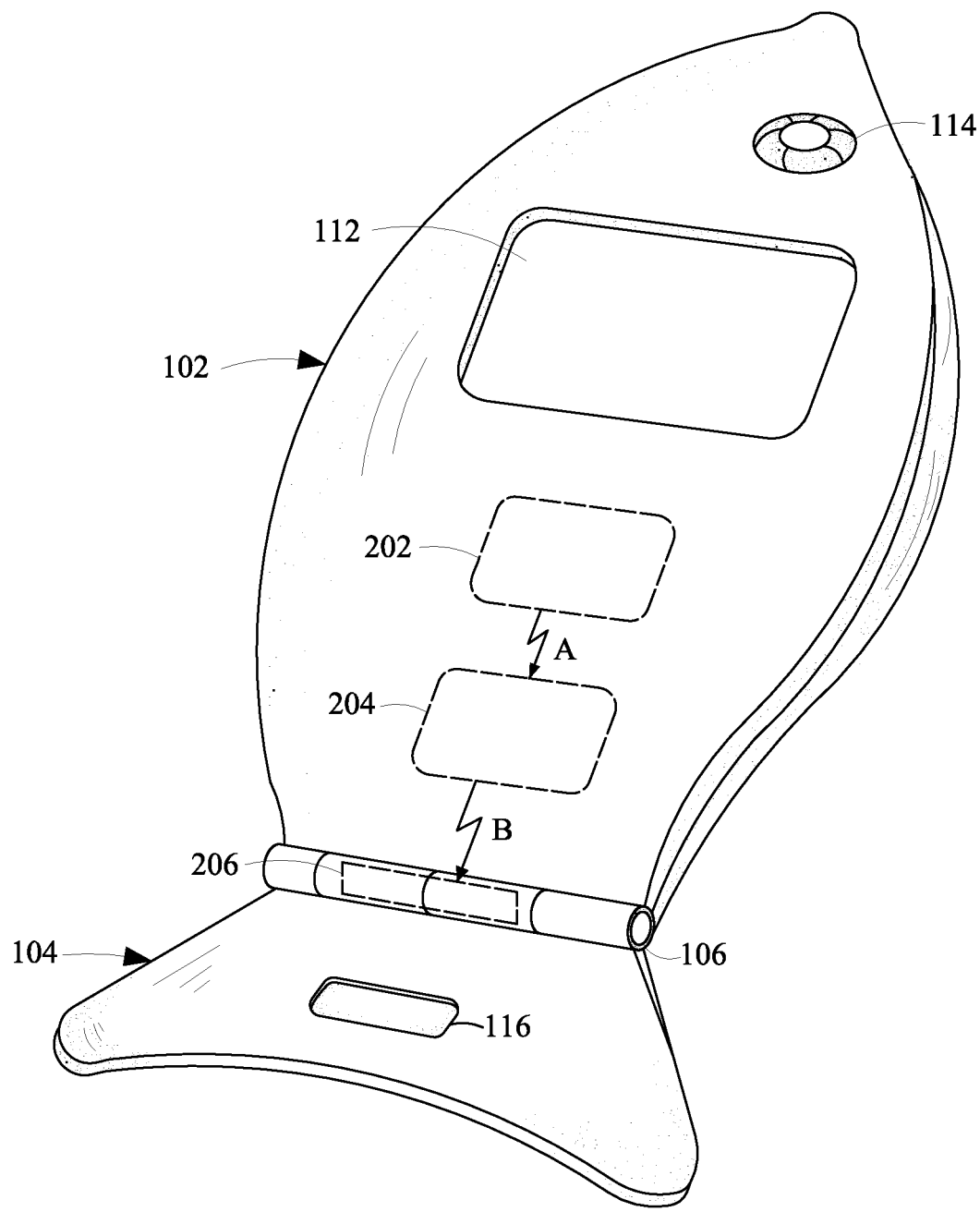
FIG. 3 depicts a perspective view of the wireless communication device 100 with the vibration assembly 200, according to an exemplary embodiment of the present invention.

FIG. 2 depicts a block diagram representation of a vibration assembly 200 configured to operate in the wireless communication device 100 for alerting a user about an occurrence of an event, according to an exemplary embodiment of the present invention. FIG. 3 depicts a perspective view of the wireless communication device 100 with the vibration assembly 200, according to an exemplary embodiment of the present invention.

As used herein, the term, "vibration assembly," may refer to an electrical circuitry, and accordingly, may specifically refer to at least one of one or more processing devices executing software, such as microprocessors, digital signal processors (DSPs), microcontrols or discrete logic, state machines or any suitable combination of hardware, software and/or firmware.

As depicted in FIG. 2, the vibration assembly 200 includes a receiving unit 202 for receiving a user alert signal for an occurrence of an event. More specifically, the receiving unit 202 is capable of receiving a signal for an occurrence of an incoming call. Accordingly, the user alert signal is an incoming call signal. It should be apparent that the receiving unit 202 may be capable of receiving a user alert signal for occurrence of any other event. Suitable examples of the other event may include, but are not limited to, an incoming message, an alarm and an upcoming appointment.

It should be understood that the wireless communication device 100 is communicably connected to a base station that is particularly assigned to the wireless communication device 100. The communicable connection between the wireless communication device 100 and the base station is made by the use of radio signals having a frequency band and a signal format, which are known in the art. Further, it should be understood that in case of an incoming call, the base station directs or transmits the user alert signal, more specifically the incoming call signal, to the receiving unit 202 of the vibration assembly 200. Accordingly, it should be understood that the receiving unit 202 may be a receiving unit that is known in the art and is capable of receiving an incoming call signal. For the purpose of this description, the receiving unit 202 is configured within the first body portion 102 of the wireless communication device 100, as depicted in FIG. 3. However, it should be apparent to a person skilled in the art that the receiving unit 202 may be configured on the first body portion 102 of the wireless communication device 100. Alternatively, the receiving unit 202 may be configured either on or within the second body portion 104 of the wireless communication device 100.

The received user alert signal is transmitted to a vibration controller unit 204 of the vibration assembly 200, as depicted by an arrow "A" in FIG. 3. More specifically, the vibration controller unit 204 is operatively coupled to the receiving unit 202 (as depicted in FIG. 2), and generates and transmits a vibration control signal (as depicted by an arrow "B" in FIG. 3) in response to the received user alert signal. It should be apparent to a person skilled in the art that the vibration controller unit 204 may be configured either on or within the first body portion 102 of the wireless communication device 100. Alternatively, the vibration controller unit 204 may be configured either on or within the second body portion 104 of the wireless communication device 100. For the purpose of this description, the vibration controller unit 204 is configured within the first body portion 102, as depicted in FIG. 3.

The vibration controller unit 204 is capable of controlling frequency and magnitude of the vibration control signal in response to the frequency and magnitude of the received user alert signal. Accordingly, it should be understood that in one aspect, functioning of the vibration controller unit 204 depends on the received user alert signal. It should also be understood that in addition to generating and transmitting a vibration control signal in response to an incoming call, the vibration controller unit 204 may regulate other mechanisms that are known in the art.

In addition to the aforementioned components, the vibration assembly 200 further includes an actuator 206 operatively coupled to the vibration controller unit 204 for receiving the transmitted vibration control signal. The transmission of the vibration control signal to the actuator 206 is depicted by the arrow "B" in FIG. 3. The term, "actuator", as used herein, refers to a mechanical device for either moving, vibrating or controlling a movement of an object. Suitable examples of the actuator 206 may include, but are not limited to, a motor, a spring, a gear, a cam or other suitable items that individually or together function for contributing to a moving mechanism or a vibrating mechanism. For the purpose of this description, the actuator 206 is configured within the hinge 106 (as depicted in FIG. 3) of the wireless communication device 100, and accordingly, is proximal to the second body portion 104 of the wireless communication device 100. It should be apparent to a person skilled in the art that the actuator 206 may be configured at any other suitable position within the wireless communication device 100. However, such a suitable position should be a position, which is proximal to the second body portion 104 of the wireless communication device 100.

The actuator 206 on receiving the transmitted vibration control signal vibrates the second body portion 104 of the wireless communication device 100. Without departing from the scope of the present invention, it should be understood that such a vibration mechanism may also be accompanied by various types of ringing mechanisms that are known in the art.

It should also be understood that the actuator 206 is controlled by the vibration controller unit 204. Further, it should be apparent that based on receiving a user alert signal for an incoming call, the above-described components of the vibration assembly 200 function in conjunction with each other to vibrate the second body portion 104. A method illustrating such functionality for vibrating the second body portion 104 of the wireless communication device 100, for alerting a user about an occurrence of an event is explained in conjunction with FIG. 4.

Figure 4:
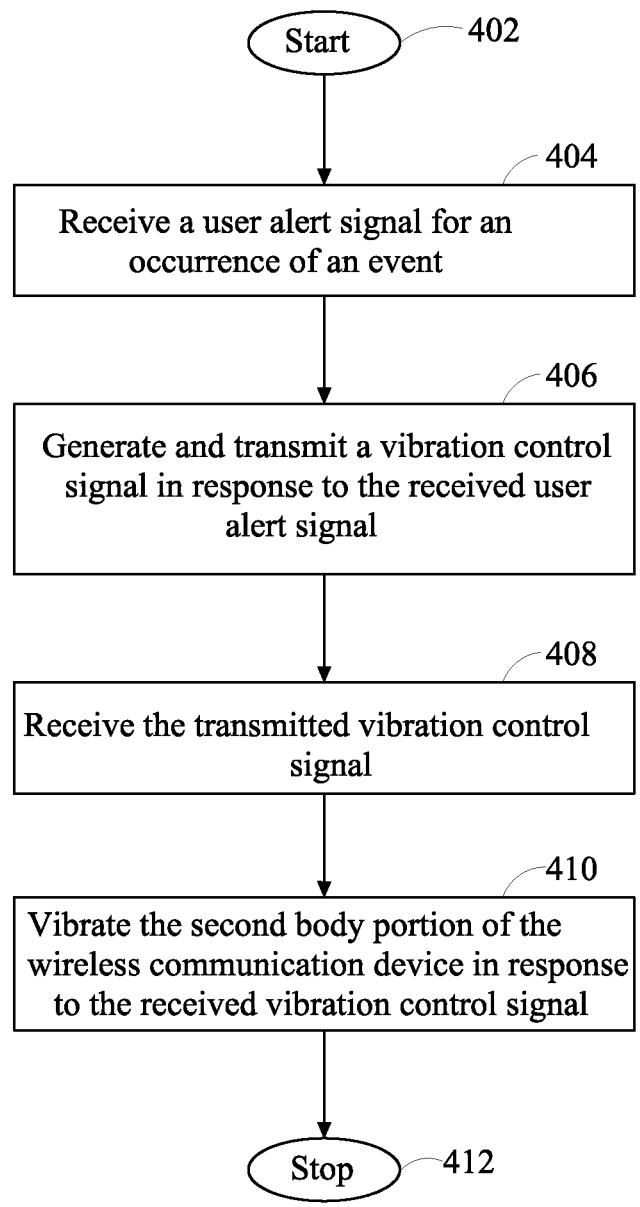
FIG. 4 depicts a flow diagram representation of a method for alerting the user of the wireless communication device 100 about the occurrence of an event, according to an exemplary embodiment of the present invention.

FIG. 4 depicts a flow diagram representation of a method for alerting a user of the wireless communication device 100 about an occurrence of an event, according to an exemplary embodiment of the present invention. The method starts at 402 when the wireless communication device 100 is ready to receive a user alert signal from the base station for an occurrence of an event. More specifically, the user alert signal transmitted by the base station is an incoming call signal. At 404, the receiving unit 202 receives the user alert signal. The received user alert signal is transmitted to the vibration controller unit 204 of the vibration assembly 200 (as depicted by the arrow "A" in FIG. 3).

At 406, the vibration controller unit 204, which is operatively coupled to the receiving unit 202, generates a vibration control signal in response to the received user alert signal. Subsequently, the vibration controller unit 204 transmits the vibration control signal to the actuator 206.

At 408, the actuator 206, which is configured within the hinge 106 of the wireless communication device 100, receives the transmitted vibration control signal. Subsequently and as depicted at step 410, the second body portion 104 vibrates. More specifically, the actuator 206 causes the second body portion 104 to vibrate in response to receiving the vibration control signal. Accordingly, the vibration of the second body portion 104 alerts the user about the occurrence of an event. More specifically, the vibration of the second body portion 104 alerts the user about the incoming call. The method terminates at 412 when the vibration of the second body portion 104 alerts the user about the incoming call.

It should be apparent to a person skilled in the art that the vibration assembly 200 and/or the components thereof may be operatively coupled to a first button and a second button of the buttons 110 of the wireless communication device 100. The first button of the wireless communication device 100 may be pressed by the user for receiving the incoming call. Accordingly, the vibration controller unit 204 may terminate the generation and transmission of the vibration control signal in order to stop the vibration of the second body portion 104. Alternatively, the second button of the wireless communication device 100 may be pressed by the user for rejecting the incoming call. Accordingly, the vibration controller unit 204 may terminate the generation and transmission of the vibration control signal in order to stop the vibration of the second body portion 104. However, use of such an operative coupling of the vibration assembly 200 and the components thereof to the above-described first button and the second button should not be considered as a limitation to the scope of the present invention.

Without departing from the scope of the present invention, the above-described method may further include displaying information about the occurrence of an event on the display screen 112 of the first body portion 102 of the wireless communication device 100. More specifically, the method may include displaying information about the incoming call on the display screen 112 of the first body portion 102 of the wireless communication device 100.

Based on the foregoing, the present invention provides a user-friendly fish-shaped wireless communication device, which is easily operable by individuals of any age group. More specifically, the wireless communication device of the present invention includes a large keypad for an easy accessibility and optimal functionality, and an easy-to-read display screen for enhancing the readability of information displayed thereon. Further, the wireless communication device includes a vibration tail user alert in form of the second body portion (as described above), which is capable of vibrating in order to alert a user about an occurrence of an event, such as an incoming call. Furthermore, for an enhanced aesthetic appearance, the fish-shaped wireless communication device includes a moving eye and possesses a scaly texture. Additionally, due to the specific shape, the wireless communication device is capable of conveniently fitting within the user's hand.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, and thereby enable others skilled in the art to best utilize the invention and various embodiments with various modifications as are suited to the particular use contemplated. It is understood that various omissions and substitutions of equivalents are contemplated as circumstances may suggest or render expedient, but such are intended to cover the application or implementation without departing from the spirit or scope of the claims of the present invention.

What is claimed is:

1. A method for alerting a user of a wireless communication, via a wireless communication device comprising a first body portion, wherein the first body portion of the wireless communication device further comprises a moving eye assembly and a second body portion, the method comprising:
   receiving a user alert signal for an occurrence of an event;
   generating and transmitting a vibration control signal in response to the received user alert signal;
   receiving the transmitted vibration control signal;
   using the moving eye assembly to simulate the movement of an eyeball of an eye of a real fish in a specific manner to alert the user of a function of the communication device, and
   vibrating the second body portion of the wireless communication device in response to the received vibration control signal, thereby alerting the user about the occurrence of an event, wherein the wireless communication device is configured to have a shape of a fish.

2. The method of claim 1, wherein the user alert signal is an incoming call signal.

3. The method of claim 1, wherein the occurrence of an event is an occurrence of an incoming call.

4. The method of claim 3 further comprises displaying information about the incoming call on a display screen configured on the first body portion of the wireless communication device.

5. The method of claim 4, wherein the display screen is a colored screen.

6. The method of claim 1, wherein the first body portion of the wireless communication device comprises as alphanumeric keypad.

7. The method of claim 1, wherein the first body portion of the wireless communication device further comprises a battery.

8. The method of claim 1, wherein the wireless communication device is a flip phone.

* * * * *